July 31, 1951 L. HITCHCOCK 2,562,786
DEFINITE POSITION RELEASED CLUTCH
Filed Dec. 12, 1947 4 Sheets-Sheet 2

Inventor
Lloyd Hitchcock,
By Mann, Porter, Diller & Stewart
attys.

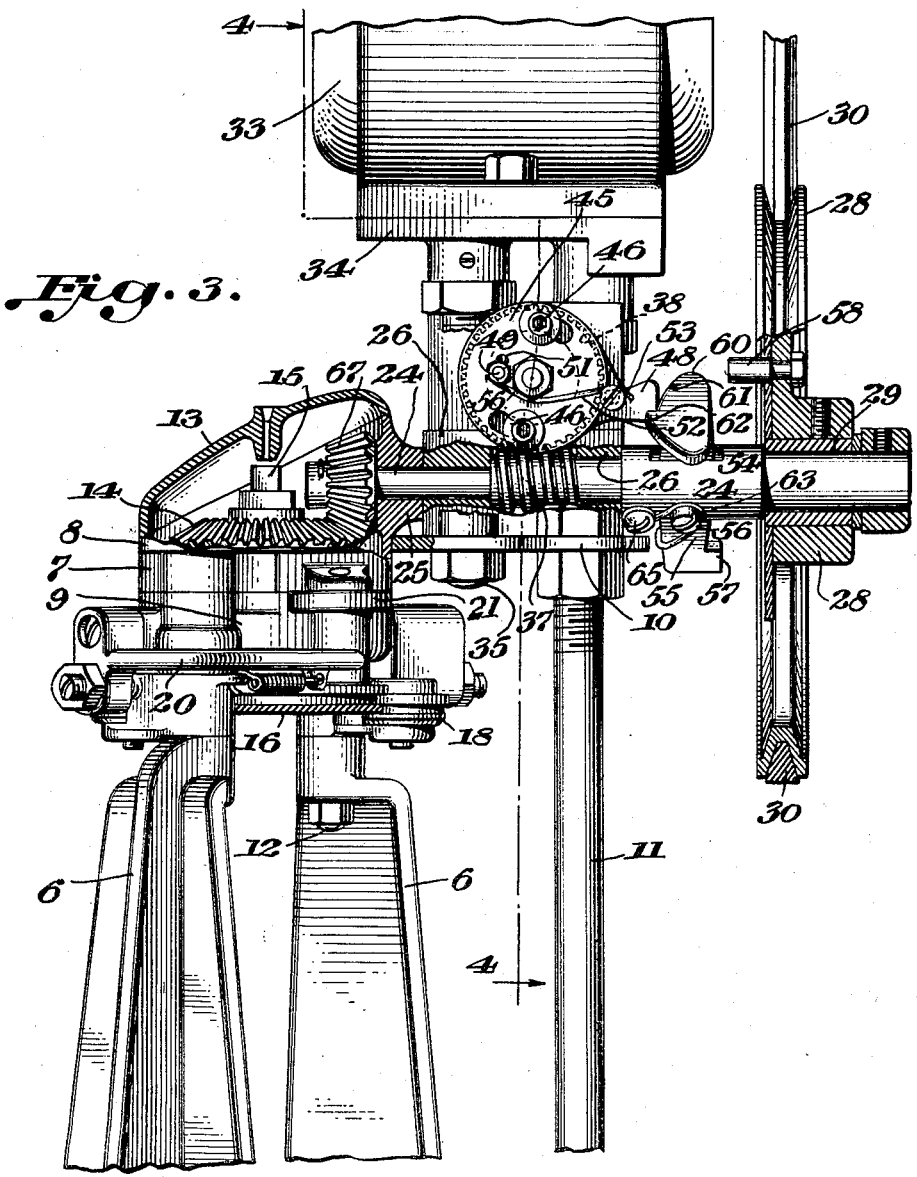

July 31, 1951  L. HITCHCOCK  2,562,786
DEFINITE POSITION RELEASED CLUTCH
Filed Dec. 12, 1947  4 Sheets-Sheet 4

Inventor
Lloyd Hitchcock,

By
Mason, Porter, Diller & Stewart
attys.

Patented July 31, 1951

2,562,786

UNITED STATES PATENT OFFICE 2,562,786

DEFINITE POSITION RELEASED CLUTCH

Lloyd Hitchcock, Athens, Ga., assignor to Dixie Canner Company, Athens, Ga., a corporation of Georgia Application December 12, 1947, Serial No. 791,287

4 Claims. (Cl. 192—33)

The invention relates generally to can head seamers and primarily seeks to provide a novel can head seamer structure in which the seaming devices are power operated, and in which are included novel means for manually initiating and automatically terminating each seaming cycle.

While the invention is adaptable to use in can head seamer structures of various forms, it is particularly designed for use in structures of the type disclosed in U. S. Letters Patent 2,023,598 issued to A. L. Kronquest on December 10, 1935, and has been so illustrated herein. In machines of the type referred to the seaming devices are hand actuated and include first and second operation seaming rollers adapted to be pressed inwardly against the can end or cover for effecting the desired seaming on of said end, said seaming rollers being supported on pivotally mounted arms carrying actuater rollers movable outwardly by a differentially driven cam equipment for the purpose of moving the seaming rollers into operative position as aforesaid. As the seaming rollers are pressed against the can end seam in process of being formed, the roller pressure is opposed by a rotary chuck which engages in the depression in the can end and imparts rotation to the can during the seaming operation. In order to permit free chucking of the can, that is the initial moving of the can and its end closure into engagement with the chuck prior to commencement of the seaming operation, it is essential that each seaming cycle be terminated with both seaming rollers moved to their ineffective or outermost positions, clear of the chuck. It is an object of the present invention to provide, in combination with can head seaming means of the character stated, novel power applying means for driving the chuck and moving the roller positioning cam equipment capable of being manually actuated to initiate a seaming cycle, and which acts automatically to terminate each cycle thus initiated with the seaming rollers moved outwardly to their ineffective or outermost position.

In its more detailed nature the invention seeks to provide a power applying means of the character stated including a driver shaft connected in driving relation with the chuck and seaming roller positioning devices, a continuously rotated driving rotor having a driving pin projecting therefrom, a clutch lever pivotally mounted intermediately of its ends in a slot formed in the driver shaft and having one end projecting into position for being engaged by the driving pin for imparting rotation to the driver shaft and a displacer and stop cam head at its other end, spring means constantly tending to place the lever in position for being engaged by the driving pin, a displacer and stop member adapted to be engaged by the displacer and stop cam head for moving and holding the lever out of the path of travel of the driving pin, manually operable mean for shifting the displacer and stop member from its lever holding position to initiate a seaming cycle, and means for automatically returning the displacer and stop member to its lever displacing and holding position after a predetermined number of revolutions of the driver shaft for automatically terminating a seaming cycle.

Another object of the invention is to provide a can head seaming machine drive control of the character stated in which the lever displacer and stop member is mounted on a rotary carrier gear coupled with the driver shaft to be rotated thereby in timed relation to each seaming cycle, said mounting being such as will permit a limited free movement of the displacer and stop member relative to the rotary carrier effective to permit manual displacement of the lever displacer and stop member from its lever intercepting and holding position for the purpose of initiating a seaming cycle.

Another object of the invention is to provide a can head seaming machine drive control of the character stated in which the driver shaft has a speed reduction worm gear connection with a rotor from which a driving pin projects through a slot in a disk secured to a manually rockable shaft extending axially through the rotor, thereby mounting the disk for limited rocking movement relative to said rotor, and in which the lever displacer and stop member projects from a second disk adjustably secured to the first mentioned disk so as to be rotatable with the rotor and yet subject to lever releasing movement with the manually rockable shaft relative to said rotor.

With the above and other objects in view that will hereinafter appear, the nature of the invention will be more clearly understood by reference to the following detailed description, the appended claims, and the several views illustrated in the accompanying drawings.

In the drawings:

Figure 3 is a fragmentary right side elevation illustrating the drive control devices in the ineffective, declutched condition, parts of the driving rotor and the gear housing being broken away and in section.

Figure 1:
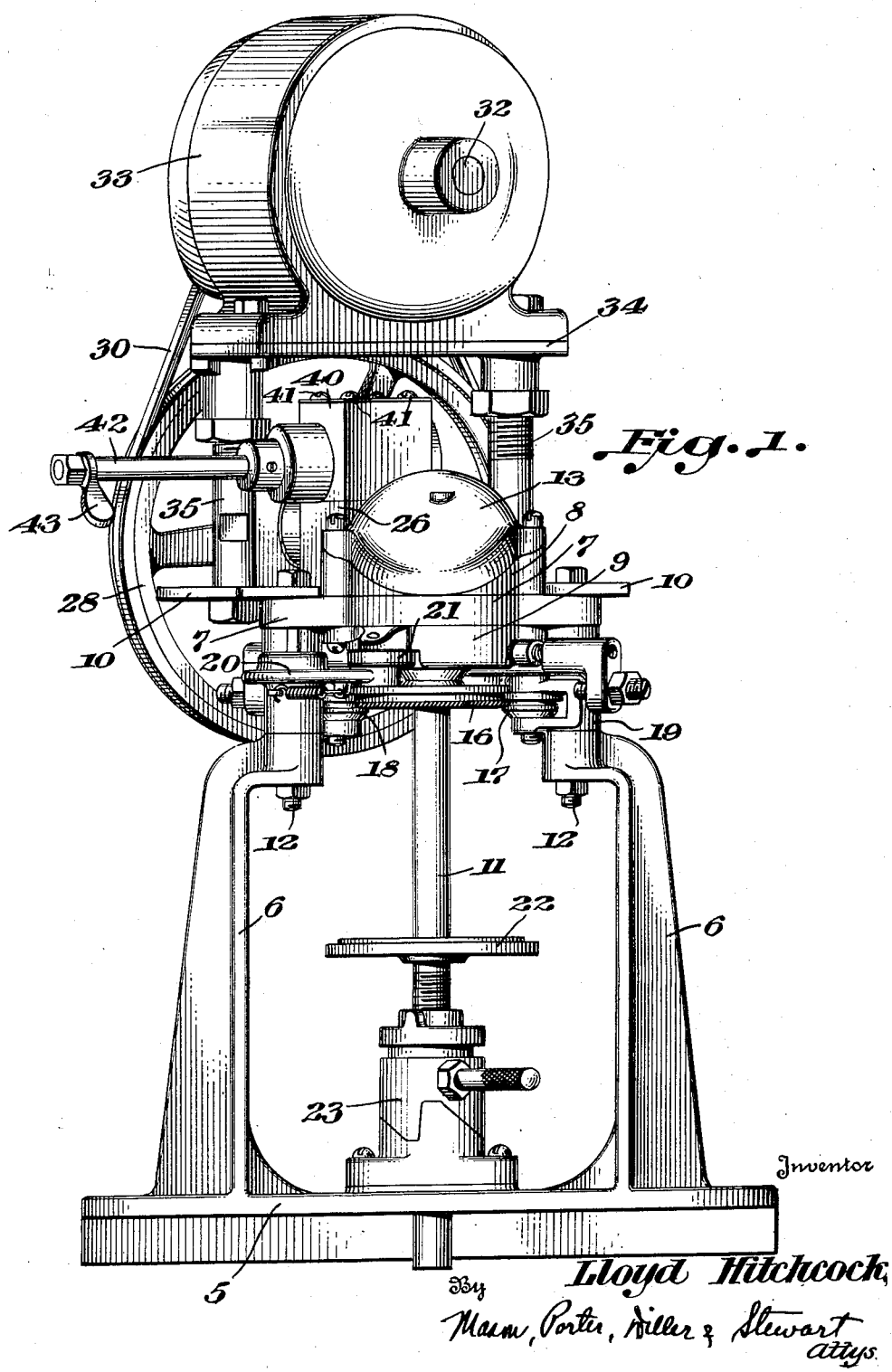
Figure 1 is a front elevation illustrating a can head seaming machine with the invention incorporated therein.

In the example of embodiment of the invention herein disclosed, the can head seaming machine structure is illustrated as including a frame base portion 5 from which rises two frame standards 6 whereon is supported the seaming head plate 7. A gear housing 8 projects upwardly from the plate 7, and the differential driving cam equipment housing 9 depends from said plate in the manner clearly illustrated in Figures 1 and 3 of the drawings.

A supporting plate 10 is mounted on the head plate 7, and upon a supporting standard 11 rising from the base portion 5 in the manner clearly illustrated in Figures 1 to 4 of the drawings, and the bolts 12 secure the plates 7 and 10 and the standards 6 in rigid assembly.

The gear housing 8 is equipped with a removable cover 13, and within said housing a driver bevel gear 14 forming a part of the differential speed drive for the seaming device operating cams (not shown) is secured upon the vertically disposed shaft 15 to the lower end of which the chuck 16 is secured.

First and second operation seaming rollers respectively designated 17 and 18 are provided, and each is carried by a crank arm 19 which is rockable about the center of one of the bolts 12 and actuated by an actuator lever 20. Each actuator lever 20 is equipped with an actuator roller 21 adapted to engage with the previously referred to actuator cams. The seaming mechanism herein briefly referred to may be of any approved form, but as previously stated, preferably is the well known Kronquest mechanism disclosed in U. S. Letters Patent 2,023,598 previously referred to herein. Since this mechanism is well known and disclosed in detail in the patent referred to, further detailed description thereof is thought to be unnecessary herein.

During the seaming operations the cans are supported upon the freely rotatable support pad 22 which may be lifted and lowered to present the can for engagement with the chuck 16 and for lowering the same away from said chuck by the manually operated lifting and lowering device generally designated 23.

Figure 2:
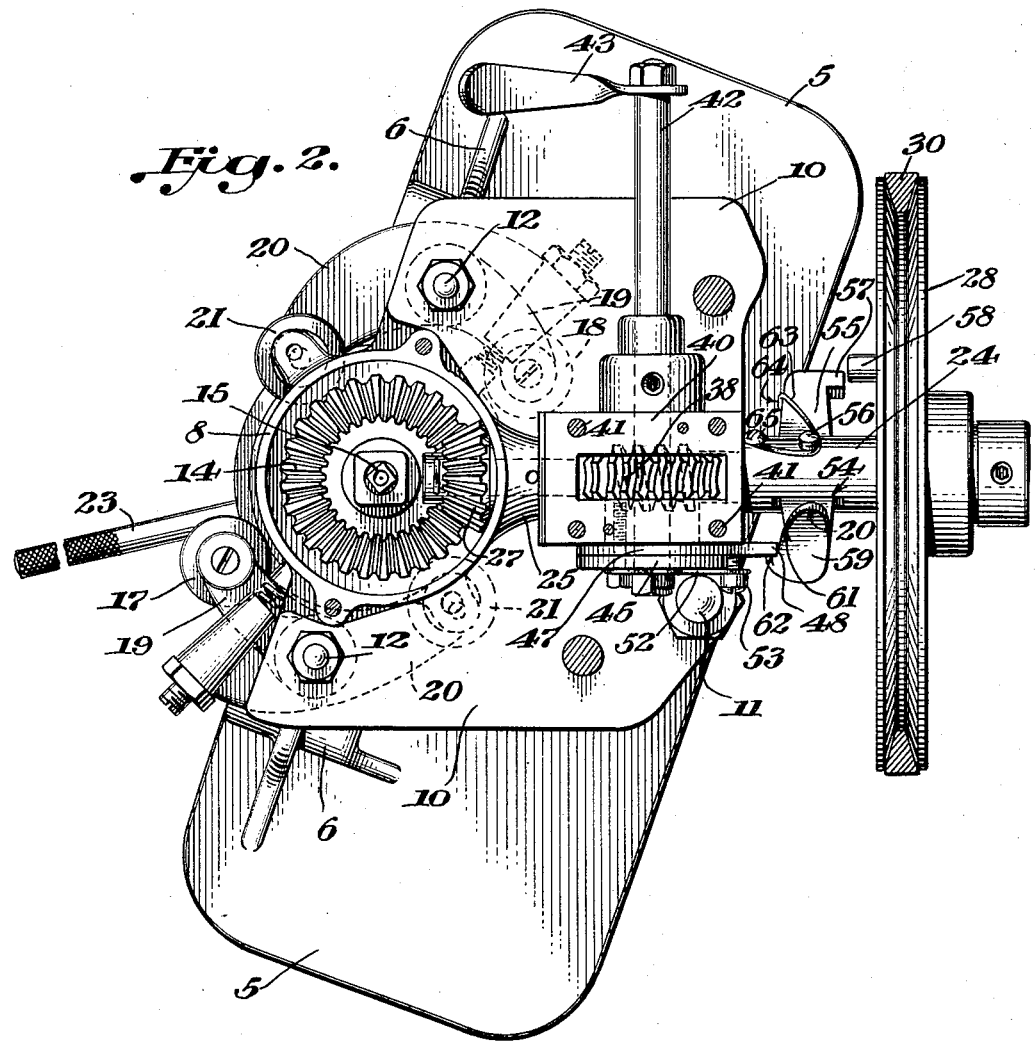
Figure 2 is a plan view in part horizontal section illustrating the invention, the driving motor supporting standards being shown in section and the gear housing covers being shown removed.

A driver shaft 24 is rotatably mounted in a bearing 25 provided therefor in the gear housing 8 and in suitable bearings provided in the gear box 26 which is secured upon the supporting plate 10 in the manner clearly illustrated in Figures 2 and 3 of the drawings. The shaft 24 projects into the interior of the gear housing 8 where it has a bevel pinion 27 secured thereon in position for meshing with and driving the previously mentioned driver bevel gear 14.

A rotor in the form of a large pulley 28 is freely rotatably mounted as at 29 on the outer end of the driver shaft 24 in the manner clearly illustrated in Figure 3, and said pulley is adapted to be continuously driven through the transmission belt 30 from the small pulley 31 secured on the shaft 32 of the motor 33. The motor is mounted on a supporting plate 34 which is in turn supported on standards 35 secured to and extending upwardly from the supporting plate 10. See Figures 1 to 4.

Figure 5:
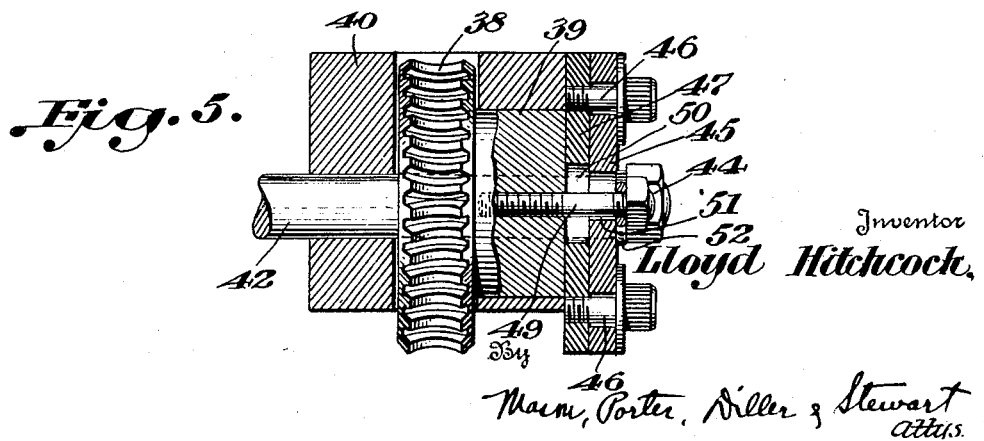
Figure 5 is a fragamentary vertical longitudinal section taken through the displacer and stop member and the rotary carrier to which the same is attached.
Figure 4:
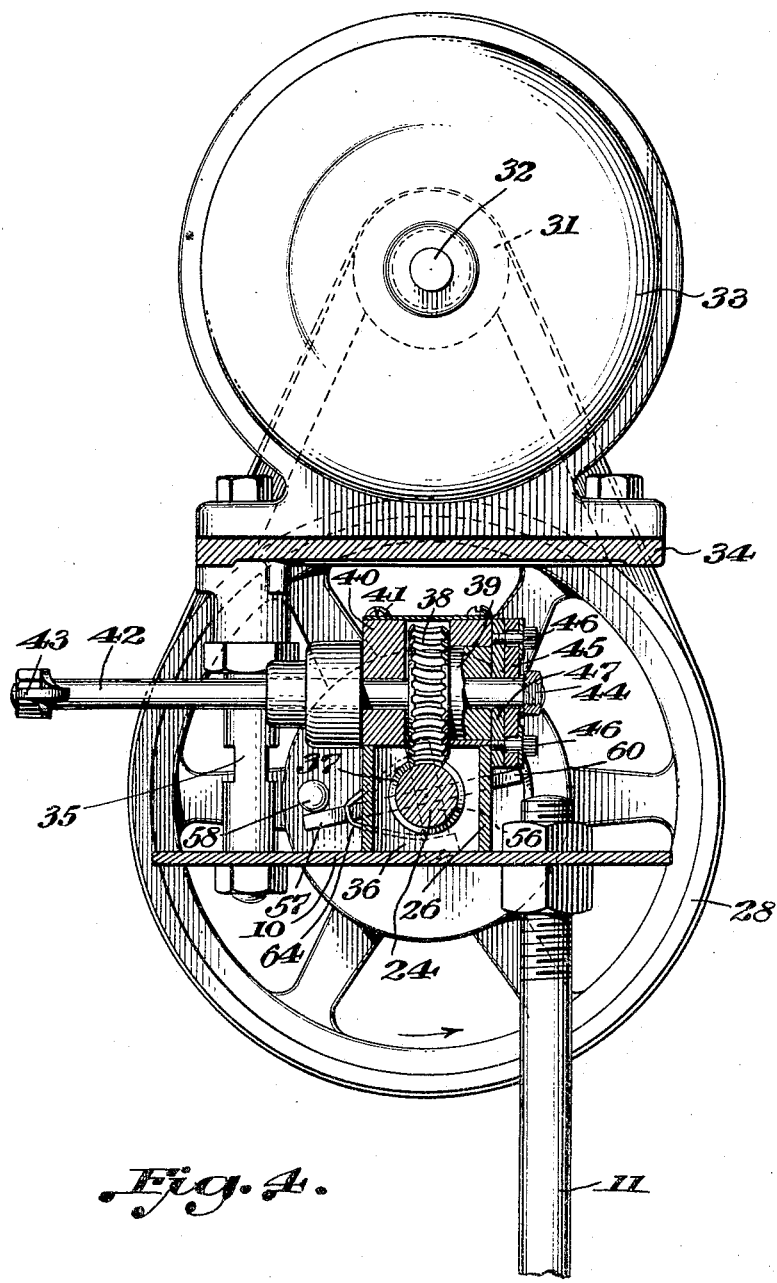
Figure 4 is a vertical cross section taken on the line 4—4 on Figure 3.

Within the chamber 36 of the gear box 26 the shaft 24 is equipped with a worm gear 37 which meshes with and imparts slow speed rotation to a worm gear 38. The worm gear 38 is equipped with a rotary carrier in the form of a hub projection 39 and is rotatably supported in the gear box 40 which is secured on top of the gear box 26 and upon the supporting plate 10 by screws 41. It will be noted by reference to Figures 2 and 5 of the drawings that the hub projection 39 on the worm gear 38 projects through the side face of the gear box 40.

A rock shaft 42 extends axially through the gear box 40 and the worm gear 38 and its hub extension 39, and it is to be understood that while said shaft is rotatable with the worm gear 38, it is so mounted as to freely partake of a limited amount of rocking movement relative to said gear. In order to impart to the shaft 42 said relative rocking movement, the shaft is equipped at its outer end with a finger trip piece 43, and at its other end the shaft is secured as at 44 to a plate 45 which is in turn adjustably secured through slot and screw connections 46 with a plate 47 which is free on the rock shaft 42. It will be apparent by reference to Figures 2 and 3 of the drawings that the plate 47 is equipped with a radially projected lever displacer and stop member 48. See Figures 2, 3 and 5.

A driver pin 49 is secured in and projects from the worm gear hub extension 39 through an elongated slot 50 formed in the plate 47, and through a shorter slot 51 formed in the plate 45. A spring 52 connected at one end to the pin 49 and extending under the rock shaft 42 and over a screw 53 secured to and projecting from the lever displacer and stop member 48 in the manner clearly illustrated in Figures 3 and 5 of the drawings constantly tends to hold the pin 49 and the adjusted plate assembly in the driving relation illustrated in Figure 3, that is with the pin 49 in the end of the short slot 51 in the direction in which the disk assembly will be driven by the rotation of the worm gear 38 imparted thereto by the worm gear 37. However, it will be apparent that by depressing the free end of the finger piece 43 as it is positioned in Figure 1, rocking movement may be imparted to the shaft 42 relative to the stationary worm gear 38 which will be effective to move the plate assembly 45, 47 about the center of the shaft 42 and relative to the stationary drive pin 49 the limited distance permitted by the length of the slot 51. This movement of the disks will be sufficient to swing the disk extension 48, or in other words the lever displacing stop member out of its effective position shown in Figure 3 for a purpose to be described hereinafter.

In a longitudinal slot 54 provided in the driver shaft 24 there is mounted a clutch lever 55, said lever being pivoted intermediately of its ends as at 56. One end 57 of the lever projects in the manner clearly illustrated in Figures 2, 3 and 4 into position for being engaged at times by a driver pin 58 secured to and projecting from the pulley 28. The other end of the lever 55 is equipped with a displacer and stop cam head 59 having a cam nose 60 and a displacing cam surface 61 leading to a stop shoulder 62. See Figures 2 and 3. A spring 63 looped about the lever 164 and about the pivot screw 56 and secured at 65 to the shaft 24 constantly tends to move the lever end 57 into the path of movement of the driving pin 58 projecting from the pulley 28. Whenever the displacer and stop cam head 59 of the lever is in contact with the stop member 48 as shown in Figures 2 and 3 the lever end 57 will be restrained against movement into the path of the driving pin 58 and the rotating pulley will not impart rotation to the driver shaft 24. It will be obvious however that whenever the shaft 42 is manually rocked to displace the stop member 48 from the clutch lever restraining position shown in Figures 2 and 3, the lever end 57 will be swung by the spring 63 into the path of travel of the driver pin 58 so that the same will contact the lever in the manner illustrated in Figure 4 and impart the rotation of the pulley 28 to the driver shaft 24.

Assuming the parts to be in the position illustrated in Figures 2 and 3 of the drawings, with the motor 33 in operation so as to impart continuous rotation to the pulley 28, an operator desiring to seam secure a head or cover upon a can will place the can and its cover upon the pad 22 and manipulate the lifting device 23 to raise the can and its cover into proper contact with the chuck 16. It is to be understood that because of the cooperative relation and timing of the parts herein described the seaming cycles always are discontinued with the first and second operation seaming rollers 17 and 18 at their outermost positions illustrated in Figure 2 so that they will in no wise interfere with the chucking of the can in the manner stated.

By now depressing the finger piece 43 in the manner previously described, the plate assembly 45, 47 will be moved to displace the stop member 48 from its intercepting engagement with the displacer and stop cam head 59. This releasing of the lever 55 will permit the end 57 thereof to swing into the path of movement of the driver pin 58 so that said pin will be effective to impart rotation to the driver shaft 24. The rotating driver shaft 24 drives the chuck 16 to impart rotation to the can, and the differentially driven cam equipments within the housing 9 function in the well known manner to alternately move the first and second operation seaming rolls 17 and 18 into and then again away from the can head or end so as to double seam secure the same upon the can in the well known manner. The worm gears 37 and 38 are so related that the disk assembly 45, 47 and particularly the radially projecting stop member 48 will make one complete revolution during the multiple revolutions of the driver shaft 24 necessary to complete the seaming cycle and again bring the seaming rolls to the outermost position shown in Figure 2, at which time the stop member 48 will again have reached the position in which it will intercept the displacer and stop cam head and displace the lever end 57 from the path of movement of the driver pin 58 projecting from the pulley thereby to terminate the rotation of the driver shaft 24. In coming against the stop member 48 the displacer and stop cam head 59 first engages the same at the nose portion 60, the riding of the head portion or cam surface 61 against the stop member 48 serves to effect the desired displacement of the lever end 57, and as the stop shoulder 62 engages the stop member 48 the rotation of the driver shaft 24 is positively stopped in the position illustrated in Figures 2 and 3.

It will be apparent that the adjustment of the relation of the disks 45 and 47 permitted by the slot and screw equipments 46 will permit sufficient adjustment of the position of the stop member 48 to assure perfect cooperation with the displacer and stop cam head 59 so that proper displacement of the clutch lever always will be effected when the seaming rolls 17 and 18 are at their outermost or chuck freeing position as shown in Figure 2.

While one form of the invention has been shown for purposes of illustration, it is to be clearly understood that various changes in the details of construction and arrangement of parts may be made without departing from the spirit and scope of the invention as defined in the appended claims.

I claim:

1. In power applying means of the character described, a driver shaft, a rotor freely rotatable on said shaft and having a driver pin projecting therefrom, said shaft having a longitudinal slot therethrough adjacent said rotor, a clutch lever pivoted intermediate its ends in said slot and having one end thereof projected into position for being swingable into and out of the path of travel of said driver pin and its other end equipped with a displacer and stop cam head, spring means constantly tending to swing the lever into position for being engaged by and moved with said driving pin, a rotary carrier disposed with its axis transversely with respect to the axis of the shaft and being worm gear coupled to said shaft to be rotated thereby once for a predetermined plurality of revolutions of the shaft, a clutch lever releasing displacing and stopping member mounted on and rotatable with said carrier in position for intercepting and holding the clutch lever stop cam head at one point in a revolution of the carrier and rotatable independently of the carrier and about the axis thereof for releasing the clutch lever stop cam head after it has been intercepted, and manually operable means for imparting said independent rotation to said stopping member to displace it from its clutch lever stop cam head intercepting and holding position and initiate a driving of the shaft, thereafter to rotate with the carrier and return after a complete revolution of said carrier into position for again intercepting the clutch lever stop cam head to displace the clutch lever from its shaft driving position and stop rotation of the shaft after completion of said predetermined plurality of revolutions of said shaft.

2. Apparatus as defined in claim 1 in which there is included means for adjustably supporting the clutch lever releasing displacing and stopping member on the carrier to enable adjustment of the position in which it will intercept the clutch lever-stop cam head.

3. Apparatus as defined in claim 1 in which the clutch lever releasing displacing and stopping member projects from a disk disposed coaxially with relation to the rotary carrier and having a lost motion slot and pin connection therewith, and the manually operable means comprises a rock shaft rockably extending through the rotary carrier and secured at one end to said disk and having a finger piece at its other end by which the independent movement can be imparted to the disk to displace said stopping member from its clutch lever stop cam head intercepting and holding position.

4. Apparatus as defined in claim 1 in which the clutch lever releasing displacing and stopping member projects from a disk disposed coaxially with relation to the rotary carrier and having a lost motion slot and pin connection therewith, and the manually operable means comprises a rock shaft rockably extending through the rotary carrier and secured at one end to said disk and having a finger piece at its other end by which the independent movement can be imparted to the disk to displace said stopping member from its clutch lever stop cam head intercepting and holding position, and in which the disk is composed of two relatively adjustable plate portions the relation of which one to the other may be varied to accurately place the clutch lever releasing displacing and stopping member with relation to the clutch lever stop cam head.

LLOYD HITCHCOCK.

REFERENCES CITED

The following references are of record in the file of this patent:

UNITED STATES PATENTS

| Number | Name | Date |
|---|---|---|
| 1,639,552 | Brenzinger | Aug. 16, 1927 |
| 2,141,976 | Fowler | Dec. 27, 1938 |
| 2,488,820 | Laube | Nov. 22, 1949 |

FOREIGN PATENTS

| Number | Country | Date |
|---|---|---|
| 212,959 | Great Britain | Mar. 21, 1924 |
| 432,846 | Germany | Aug. 16, 1926 |